US006925643B2

(12) United States Patent
Hokenek et al.

(10) Patent No.: US 6,925,643 B2
(45) Date of Patent: Aug. 2, 2005

(54) METHOD AND APPARATUS FOR THREAD-BASED MEMORY ACCESS IN A MULTITHREADED PROCESSOR

(75) Inventors: Erdem Hokenek, Yorktown Heights, NY (US); Mayan Moudgill, White Plains, NY (US); C. John Glossner, Carmel, NY (US)

(73) Assignee: Sandbridge Technologies, Inc., White Plains, NY (US)

( * ) Notice: Subject to any disclaimer, the term of this patent is extended or adjusted under 35 U.S.C. 154(b) by 60 days.

(21) Appl. No.: 10/269,247

(22) Filed: Oct. 11, 2002

(65) Prior Publication Data

US 2004/0073772 A1 Apr. 15, 2004

(51) Int. Cl.$^7$ .................................................. G06F 9/46
(52) U.S. Cl. ....................................... 718/104; 711/100
(58) Field of Search ................................. 718/100, 104, 718/101, 102, 103, 106, 107, 105; 711/100, 147, 148, 152, 153, 170, 206; 712/202

(56) References Cited

U.S. PATENT DOCUMENTS

| | | | |
|---|---|---|---|
| 5,649,135 A | | 7/1997 | Pechanek et al. |
| 5,659,785 A | | 8/1997 | Pechanek et al. |
| 5,682,491 A | | 10/1997 | Pechanek et al. |
| 6,079,010 A | | 6/2000 | D'Arcy et al. |
| 6,128,720 A | | 10/2000 | Pechanek et al. |
| 6,230,251 B1 | | 5/2001 | Batten et al. |
| 6,256,725 B1 | | 7/2001 | Batten et al. |
| 6,260,189 B1 | | 7/2001 | Batten et al. |
| 6,263,404 B1 | * | 7/2001 | Borkenhagen et al. ...... 711/137 |
| 6,269,425 B1 | * | 7/2001 | Mounes-Toussi et al. ... 711/133 |
| 6,269,437 B1 | | 7/2001 | Batten et al. |
| 6,282,585 B1 | | 8/2001 | Batten et al. |
| 6,317,821 B1 | | 11/2001 | Batten et al. |
| 6,317,872 B1 | * | 11/2001 | Gee et al. .................... 717/152 |
| 6,341,338 B1 | * | 1/2002 | Dennie ........................ 711/147 |

OTHER PUBLICATIONS

C.J. Glossner, "The Delft–Java Engine," Doctoral Thesis, Delft University of Technology, Netherlands, Nov. 5, 2001.
"Basic Features of the HEP Supercomputer," http://www–ee.eng.hawaii.edu/~nava/HEP/introduction.html, pp. 1–2.
"The MOVE Concept," http://ce.et.tudelft.nl/MOVE/section3.2.html, pp. 1–2.
"Simultaneous Multithreading Project," http://www.-cs.washington.edu/research/ smt/index.html, pp. 1–7.
"Introduction to Multithreading, Superthreading and Hyper-threading," http://arstechnica.com/paedia/h/hyperthreading/hyperthreading–1.html, pp. 1–5.

* cited by examiner

*Primary Examiner*—Majid A. Banankhah
(74) *Attorney, Agent, or Firm*—Ryan, Mason & Lewis, LLP

(57) ABSTRACT

Techniques for thread-based memory access by a multi-threaded processor are disclosed. The multithreaded processor determines a thread identifier associated with a particular processor thread, and utilizes at least a portion of the thread identifier to select a particular portion of an associated memory to be accessed by the corresponding processor thread. In an illustrative embodiment, a first portion of the thread identifier is utilized to select one of a plurality of multiple-bank memory elements within the memory, and a second portion of the thread identifier is utilized to select one of a plurality of memory banks within the selected one of the multiple-bank memory elements. The first portion may comprise one or more most significant bits of the thread identifier, while the second portion comprises one or more least significant bits of the thread identifier. Advantageously, the invention reduces memory access times and power consumption, while preventing the stalling of any processor threads.

14 Claims, 3 Drawing Sheets

| | | | | | | | | | |
|---|---|---|---|---|---|---|---|---|---|
| Ld/St | INST DEC | RF READ | AGEN | XFER | INT EXT | MEM 0 | MEM 1 | MEM 2 | WB |
| ALU | INST DEC | RF READ | EXEC1 | EXEC2 | XFER | WB | | | |
| I_Mul | INST DEC | RF READ | EXEC1 | EXEC2 | EXEC3 | XFER | WB | | |
| V_Mul | INST DEC | RF READ | MPY1 | MPY2 | ADD1 | ADD2 | XFER | WB | |

METHOD AND APPARATUS FOR THREAD-BASED MEMORY ACCESS IN A MULTITHREADED PROCESSOR

RELATED APPLICATION(S)

The present invention is related to the inventions described in U.S. patent applications Ser. No. 10/269,372, entitled "Multitbreaded Processor With Efficient Processing for Convergence Device Applications," Ser. No. 10/269,373, entitled "Method and Apparatus for Register File Port Reduction in a Multithreaded Processor," and Ser. No. 10/269,245, entitled "Method and Apparatus for Token Triggered Multithreading," all of which are filed concurrently herewith and incorporated by reference herein.

FIELD OF THE INVENTION

The present invention relates generally to the field of digital data processors, and more particularly to memory access techniques for use in a multithreaded processor.

BACKGROUND OF THE INVENTION

Memory is an important aspect of processor design. As is well known, processors are often used in conjunction with a memory system that includes a hierarchy of different storage elements. For example, such a memory system may include a backing store, a main memory and a cache memory, as described in, e.g., M. J. Flynn, "Computer Architecture: Pipelined and Parallel Processor Design," Jones and Bartlett Publishers, Boston, Mass., 1995, which is incorporated by reference herein.

Memory performance is typically characterized by parameters such as access time and bandwidth. The access time refers to the time between a processor request for a particular piece of data from memory and the return of the requested data to the processor. The memory bandwidth refers to the number of memory access requests that can be accommodated by the memory per unit of time.

A given memory, such as the cache memory or main memory in the above-noted illustrative memory system configuration, may be organized in the form of multiple banks. Portions of the memory may also be referred to as modules. For example, a number of banks may be combined into a single memory module, or a number of modules may be combined to form one of the banks. Typically, only a subset of the banks of the memory may be active at any given time during a memory access. In the simplest possible arrangement, a single processor makes a request to a single memory module. The processor then ceases activity and waits for service from the module. When the module responds, the processor activity resumes.

Each memory module has at least two important parameters, namely, module access time and module cycle time. The module access time is the time required to retrieve data into an output memory buffer register given a valid address. Module cycle time is the minimum time between requests directed at the same module.

Historically, processors and memory were separately packaged. However, with modern integration techniques it is possible to integrate multiple modules and banks within a single integrated circuit die along with the processor.

A significant problem with conventional memory access techniques is that such techniques are generally not optimized for use with multithreaded processors, that is, processors which support simultaneous execution of multiple distinct instruction sequences or "threads." For example, conventional memory access techniques when applied to multithreaded processors often require an excessive number of read and write ports, which unduly increases power consumption. In addition, such techniques when applied to multithreaded processors can result in the stalling of particular processor threads, and increased memory access times.

As is apparent from the foregoing, a need exists for improved memory access techniques for use in conjunction with a memory associated with a multithreaded processor.

SUMMARY OF THE INVENTION

The present invention provides improved memory access techniques for a multithreaded processor. More particularly, the memory access techniques of the invention in an illustrative embodiment thereof provide thread-based bank access in a memory associated with a multithreaded processor, such that memory access related stalling of processor threads is avoided.

In accordance with the invention, a multithreaded processor determines a thread identifier associated with a particular processor thread, and utilizes at least a portion of the thread identifier to select a particular portion of an associated memory to be accessed by the corresponding processor thread. For example, a first portion of the thread identifier may be utilized to select one of a plurality of multiple-bank memory elements within the memory, and a second portion of the thread identifier may be utilized to select one of a plurality of memory banks within the selected one of the multiple-bank memory elements. The first portion may comprise one or more most significant bits of the thread identifier, while the second portion comprises one or more least significant bits of the thread identifier.

As a more particular example, each of the multiple-bank memory elements may include an even memory bank and an odd memory bank, with a least significant bit of the second portion of the thread identifier being utilized to select one of the even memory bank and the odd memory bank for access by the corresponding processor thread.

Other aspects of the invention relate to token triggered threading and pipelined instruction processing. For example, the multithreaded processor may be configured to implement token triggered threading. This type of threading utilizes a token to identify, in association with a current processor clock cycle, a particular hardware thread unit or context that will be permitted to issue an instruction for a subsequent clock cycle.

Advantageously, the invention significantly reduces memory access time and power consumption in a multithreaded processor, without any loss of processor performance. For example, in the illustrative embodiment, two read or write memory accesses can be achieved in a single processor cycle using only a single memory port.

DETAILED DESCRIPTION OF THE INVENTION

The present invention will be illustrated herein as implemented in a multithreaded processor having associated therewith a main memory, a multithreaded cache memory, and a multithreaded data memory. It should be understood, however, that the invention does not require the use of the particular multithreaded processor and memory configurations of the illustrative embodiment, and is more generally suitable for use in any multithreaded processor memory access application in which it is desirable to provide a reduction in the number of required memory ports and thus reduced power consumption.

An example processing system 100 which implements a memory access technique in accordance with the invention will be described in conjunction with FIGS. 1 and 2.

Figure 1:
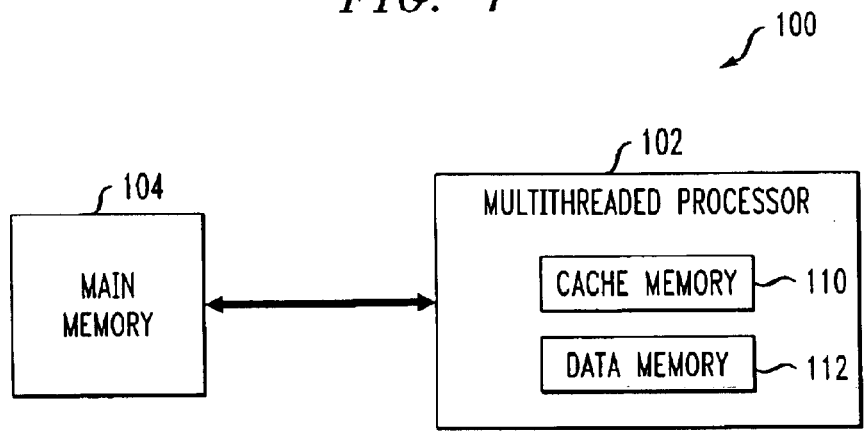
FIG. 1 is a block diagram of an example processing system in which the invention is implemented.

FIG. 1 shows the processing system 100 as including a multithreaded processor 102 coupled to a main memory 104. The multithreaded processor 102 includes a multithreaded cache memory 110 and a multithreaded data memory 112.

Figure 2:
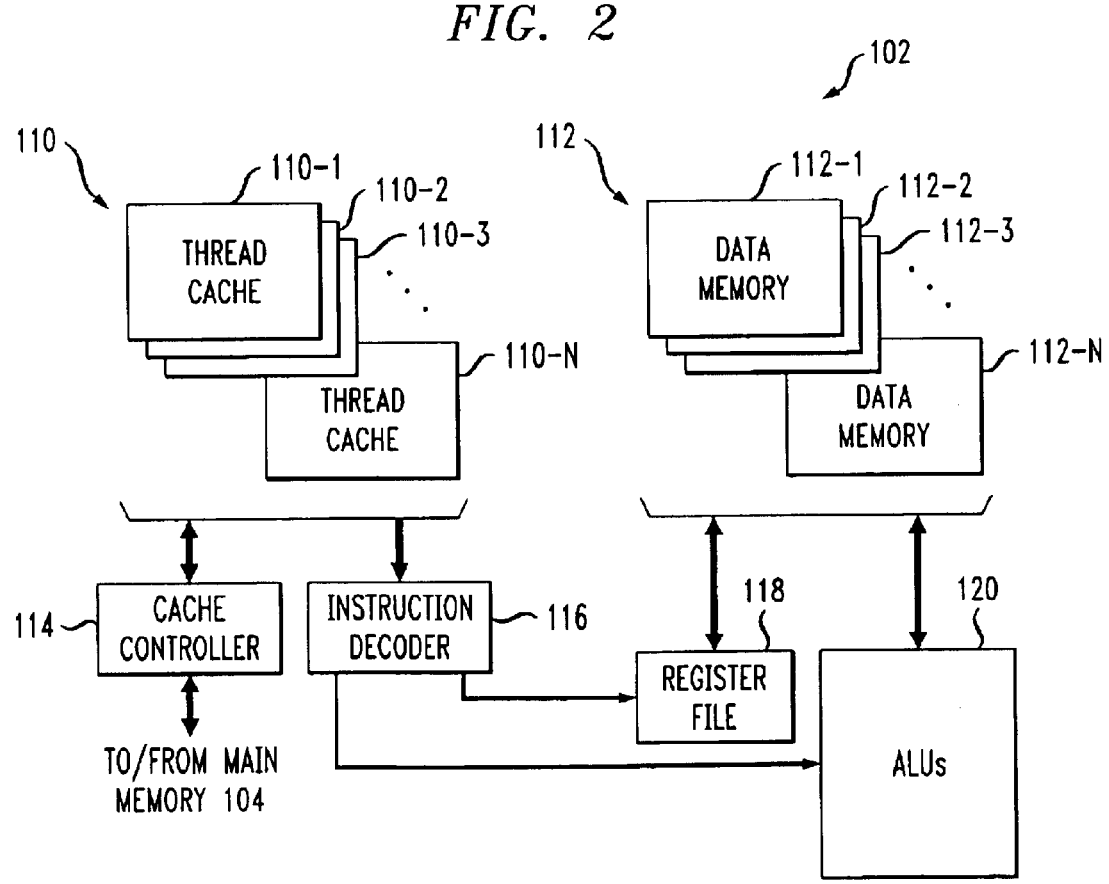
FIG. 2 is a more detailed block diagram of an illustrative embodiment of a multithreaded processor of the FIG. 1 processing system.

FIG. 2 shows a more detailed view of one possible implementation of the multithreaded processor 102. In this embodiment, the multithreaded processor 102 includes the multithreaded cache memory 110, the data memory 112, a cache controller 114, an instruction decoder 116, a register file 118, and a set of arithmetic logic units (ALUs) 120. The multithreaded cache memory 110 is also referred to herein as a multithreaded cache.

It should be noted that the particular arrangements shown in FIGS. 1 and 2 are simplified for clarity of illustration, and additional or alternative elements not explicitly shown may be included, as will be apparent to those skilled in the art.

The multithreaded cache 110 includes a plurality of thread caches 110-1, 110-2, . . . 110-N, where N generally denotes the number of threads supported by the multithreaded processor 102. Each thread thus has a corresponding thread cache associated therewith in the multithreaded cache 110. Similarly, the data memory 112 includes N distinct data memory instances, denoted data memories 112-1, 112-2, . . . 112-N as shown.

Each of the thread caches in the multithreaded cache 110 may comprise a memory array having one or more sets of memory locations. A given thread cache may further comprise a thread identifier register for storing an associated thread identifier, as will be described in greater detail below in conjunction with FIG. 6.

The multithreaded cache 110 interfaces with the main memory 104 via the cache controller 114. The cache controller 114 ensures that the appropriate instructions from main memory 104 are loaded into the multithreaded cache 110. The cache controller 114 in this illustrative embodiment, operating in conjunction with logic circuitry or other processing elements associated with the individual thread caches 110-1, 110-2, . . . 110-N, implements at least a portion of an address mapping technique, such as fully associative mapping, direct mapping or set-associative mapping. Illustrative set-associative mapping techniques suitable for use in conjunction with the present invention are described in U.S. patent application Ser. Nos. 10/161,774 and 10/161,874, both filed Jun. 4, 2002 and commonly assigned with the present application, and both of which are incorporated by reference herein.

In general, the multithreaded cache 110 is used to store instructions to be executed by the multithreaded processor 102, while the data memory 112 stores data that is operated on by the instructions. Instructions are fetched from the multithreaded cache 110 by the instruction decoder 116 which operates in conjunction with the register file 118 and the ALUs 120 in controlling the execution of the instructions in a conventional manner. The operation of multithreaded processor elements such as 116, 118 and 120 is well-understood in the art, and therefore not described in further detail herein.

The data memory 112 is typically directly connected to the main memory 104, although this connection is not explicitly shown in the figure.

One or more of the memories 104, 110 and 112 may each be configured so as to include multiple banks or other designated portions. By way of example, each bank may be viewed as being made up of one or more memory modules, or a specified portion of a single memory module.

The term "memory" as used herein is intended to be construed broadly so as to encompass an internal or external memory, a cache memory, a data memory, or other arrangement of data storage elements. The invention is not limited to any particular memory type, configuration or application. It should be noted, however, that memories are generally understood in the processor art as being distinct from registers such as those comprising register file 118 in FIG. 2. Techniques for thread-based access to register files are described in the above-cited U.S. patent application Ser. No. 10/269.373, entitled "Method and Apparatus for Register File Port Reduction in a Multithreaded Processor."

It should also be emphasized that the present invention does not require the particular multithreaded processor configuration shown in FIG. 2. The invention can be implemented in a wide variety of other multithreaded processor configurations.

A more particular example of multithreaded processor of the type shown in FIG. 2 and suitable for use in conjunction with the present invention is described in U.S. Provisional Application Ser. No. 60/341,289, filed Dec. 20, 2001, the conversion application thereof being the above-cited U.S. patent application Ser. No. 10/269,372, which is incorporated by reference herein. An illustrative embodiment of a multithreaded processor as described in U.S. Provisional Application Ser. No. 60/341,289 is capable of executing RISC-based control code, digital signal processor (DSP) code, Java code and network processing code. The processor includes a single instruction multiple data (SIMD) vector unit, a reduction unit, and long instruction word (LIW) compounded instruction execution.

In accordance with one aspect of the invention, a memory associated with the multithreaded processor 102 is separated into distinct portions, and a particular one of the portions is selected for access by a given processor thread using a corresponding thread identifier. More particularly, in the illustrative embodiment, the memory access time and power requirements associated with the multithreaded processor 102 are reduced by banking memory on a per-thread basis, without incurring any performance penalty. In addition, the thread-based banking approach can prevent memory access related stalling of processor threads.

The memory configured in this manner may comprise, by way of example, one or more of the main memory 104, the cache memory 110, the data memory 112, or other memory contained within or otherwise associated with the multithreaded processor 102. An example implementation of this memory access technique will be described below in conjunction with FIGS. 3, 4, 5 and 6.

The multithreaded processor 102 may be configured to utilize a threading approach referred to as token triggered threading, or other suitable threading techniques.

Figures 3, 4:
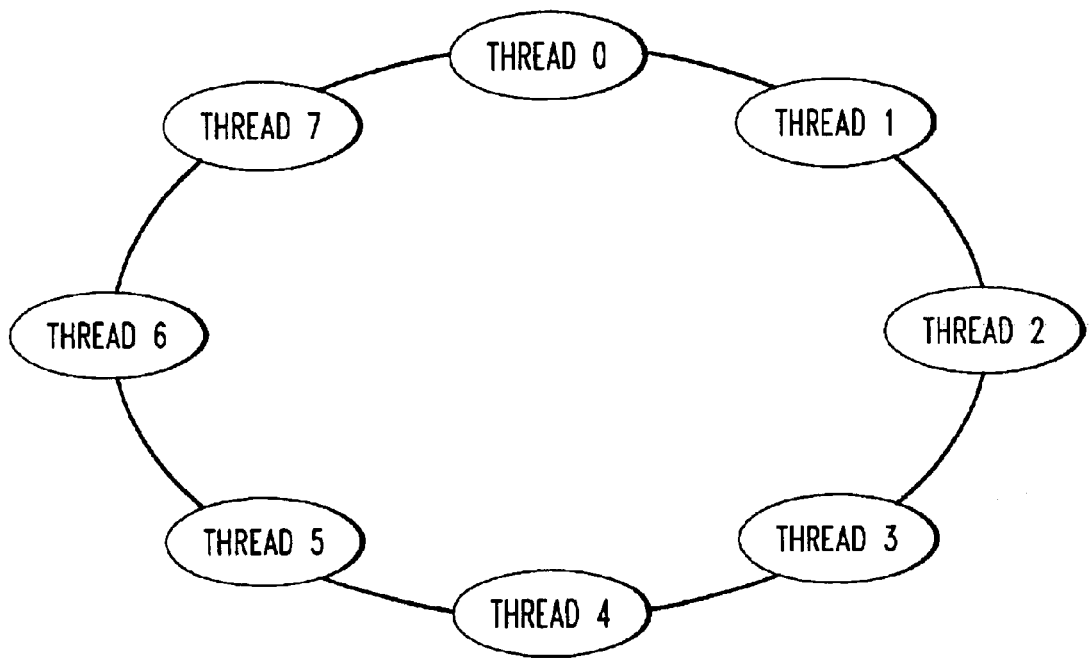
FIG. 3 illustrates an example of token triggered threading suitable for use in the multithreaded processor of FIG. 2 in accordance with the techniques of the invention.
FIG. 4 illustrates the manner in which example instruction functions may be pipelined in the FIG. 2 multithreaded processor in accordance with the techniques of the invention.

FIG. 3 shows an example of token triggered threading for an implementation of processor 102 in which the number of threads N is eight. In general, all of the threads operate simultaneously, and each accesses a corresponding instance of the thread cache 110 and data memory 112. As shown in FIG. 3, the eight threads are denoted Thread 0, Thread 1, Thread 2, . . . Thread 7, and are illustrated as being serially interconnected in the form of a ring. In the multithreaded processor, a given thread can generally be viewed in terms of hardware as well as software. The particular processor hardware associated with a given thread is therefore more particularly referred to herein as a hardware thread unit or simply a "context."

In accordance with the token triggered threading illustrated in FIG. 3, all of the hardware thread units or contexts are permitted to simultaneously execute instructions, but only one context may issue an instruction in a particular clock cycle of the processor. In other words, all contexts execute simultaneously but only one context is active on a particular clock cycle. Therefore, if there are a total of C contexts it will require C clock cycles to issue an instruction from all contexts. Each clock cycle, one of the contexts issues an instruction, and the next thread to issue an instruction is indicated by a token. In the FIG. 3 example, the tokens are arranged in a sequential or round-robin manner, such that the contexts will issue instructions sequentially. However, tokens indicating the next context to issue an instruction may be arranged using other patterns, such as an alternating even-odd pattern. Also, as noted above, other types of threading may be used in conjunction with the present invention.

FIG. 4 illustrates the manner in which example instruction functions may be pipelined in the multithreaded processor 102 in accordance with the present invention. In the illustrative embodiment of the invention, this type of pipelining is preferably utilized in conjunction with the token triggered threading described previously, but it is to be appreciated that numerous other combinations of pipelining and threading may be used in implementing the invention.

The FIG. 4 pipeline is configured for use in conjunction with the illustrative N=8 token triggered threading of FIG. 3. The example instruction functions in FIG. 4 include Load/Store (Ld/St), ALU, integer multiplication (I_Mul) and vector multiplication (V_Mul), and are shown as having nine, six, seven and eight pipeline stages, respectively.

Each of the example instruction pipelines illustrated in FIG. 4 includes at least an instruction decode stage, a register file (RF) read stage, a transfer (Xfer) stage and a writeback (WB) stage. The RF read stage involves reading from a register file, e.g., the register file 118, the transfer stage typically involves transferring instruction results to a designated holding register, and the WB stage involves writing instruction results back to memory or a register file.

The Ld/St pipeline further includes an address generation (Agen) stage, an internal (Int) or external (Ext) determination stage, and three additional memory execute stages, denoted Mem0, Mem1 and Mem2. The Ld/St pipeline thus includes a total of four memory execute stages, that is, Mem0, Mem1, Mem2 and WB. The internal or external determination stage determines if the associated memory access is to an internal or an external memory, and may be viewed as an additional decode stage within the pipeline. It should be noted that additional memory execute stages may be required for certain external memory accesses. For example, if the WB stage of an external memory access does not complete during the period of time for which the corresponding thread is active, the thread may be stalled such that the WB stage will complete the next time the thread is active.

The ALU pipeline further includes two execution stages denoted Exec1 and Exec2.

The integer I_Mul pipeline further includes three execution stages denoted Exec1, Exec2 and Exec3.

The vector V_Mul pipeline further includes two multiplication stages MPY1 and MPY2, and two addition stages Add1 and Add2.

The multithreaded processor 102 is preferably configured such that once an instruction from a particular context enters its corresponding pipeline, it runs to completion.

Figure 5:
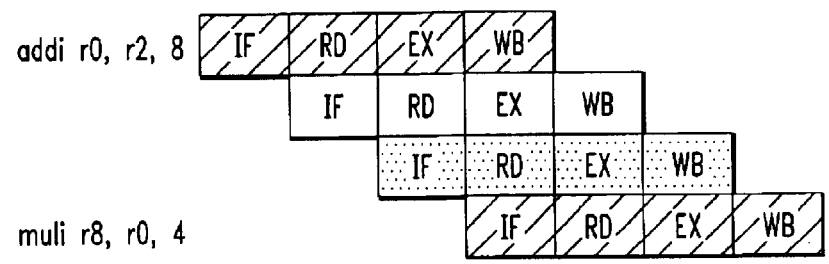
FIG. 5 shows a simplified example pipeline with multiple contexts of the FIG. 2 processor issuing instructions on successive cycles.

FIG. 5 shows a simplified example set of pipelined instructions with multiple contexts of the multithreaded processor 102 issuing instructions on successive cycles. In this example, it is assumed for simplicity and clarity of illustration that the issued instructions each include the same four pipeline stages, denoted instruction fetch (IF), read (RD), execute (EX) and writeback (WB). It is further assumed that there are three threads, and thus three contexts issuing instructions in a sequential manner similar to that described in conjunction with FIG. 3. An integer add instruction addi r0, r2, 8 is initially issued by a first one of the contexts on a first clock cycle. The other two contexts issue instructions on respective subsequent clock cycles. It takes a total of three clock cycles for each of the contexts to issue an instruction. On a fourth clock cycle, the first context issues another instruction, namely an integer multiplication instruction muli r8, r0, 4.

The FIG. 5 example serves to illustrate that with an appropriately-configured pipeline and a sufficient number of threads, all hardware contexts may be executing concurrently even though there is only a single instruction issued per context per cycle. As indicated previously, the particular number of threads and pipeline stages are purposes of illustration only, and not intended to reflect a preferred implementation. Those skilled in the art will be readily able to determine an appropriate number of threads and pipeline stages for a particular application given the teachings provided herein.

As noted above, the present invention in accordance with one aspect thereof provides an improved memory access technique for use by the multithreaded processor 102.

Generally, this improved memory access technique involves determining a thread identifier associated with a particular thread of the multithreaded processor, and utilizing at least a portion of the thread identifier to select a particular portion of the memory to be accessed by the corresponding processor thread.

More particularly, in an illustrative arrangement in which a memory to be accessed by the multithreaded processor is configured into a number of distinct memory elements each having multiple memory banks, a first portion of the thread identifier may be used to select one of the distinct memory elements within the memory, and a second portion of the thread identifier may be used to select one of the memory banks within the selected one of the memory elements.

The first portion of the thread identifier used to select one of the multiple-bank memory elements may comprise one or more most significant bits of the thread identifier, while the second portion of the thread identifier used to select one of the banks within a selected multiple-bank memory element may comprise one or more least significant bits of the thread identifier.

Figure 6:
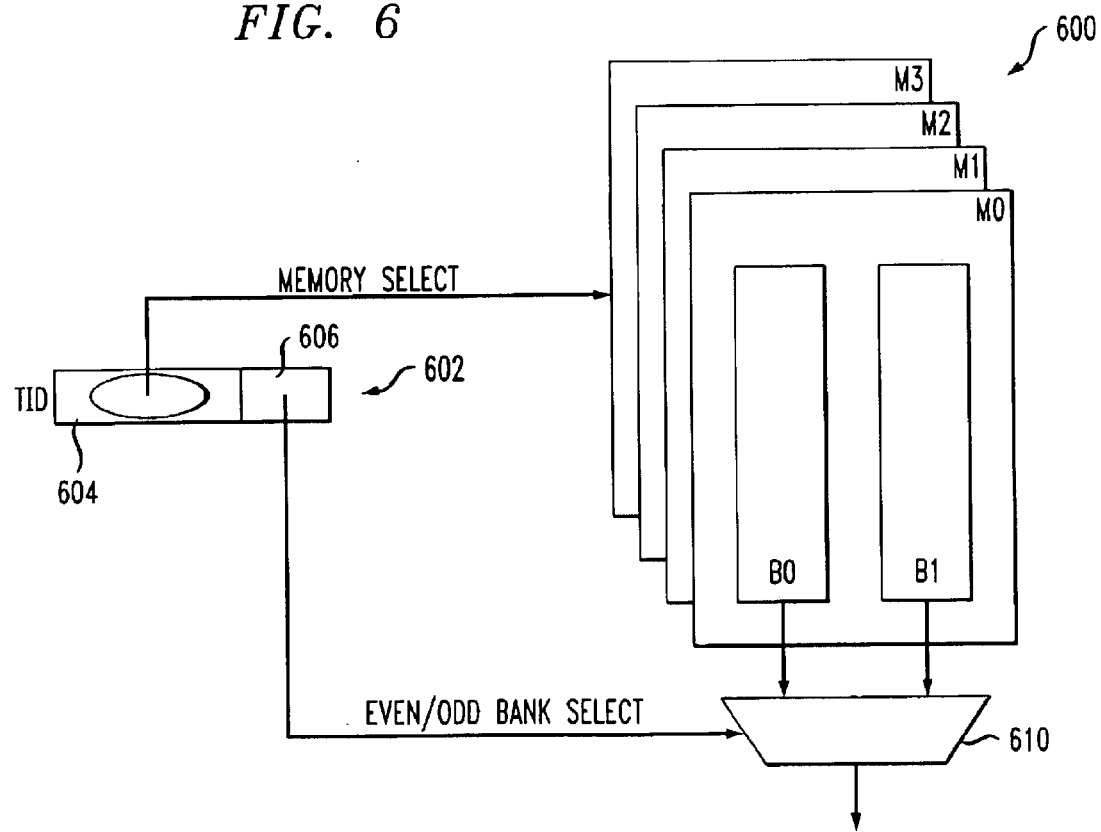
FIG. 6 illustrates a memory access technique implemented in the FIG. 2 multithreaded processor in accordance with the invention.

FIG. 6 illustrates one possible embodiment of the above-described memory access technique, implementable in the FIG. 1 processing system utilizing the multithreaded processor 102. It is assumed for this example that the number of processor threads N in the multithreaded processor 102 is eight. FIG. 6 shows a memory 600 comprising four multiple-bank memory elements denoted M0, M1, M2 and M3. The memory 600 may correspond to the main memory 104, the cache memory 110, the data memory 112, or another memory associated with the multithreaded processor 102. Each of the multiple-bank memory elements M0, M1, M2 and M3 includes a pair of memory banks denoted B0 and B1, also referred to herein as an even memory bank and an odd memory bank, respectively.

A thread identifier (TID) register 602 stores a thread identifier having a first portion 604 and a second portion 606. In this example, where N=8 as previously noted, the thread identifier is a three-bit identifier. The first portion 604 of the thread identifier comprises the two most significant bits of the three-bit identifier, and is utilized to select a particular one of the four multiple-bank memory elements M0, M1, M2 and M3. The selection circuitry utilized to select a particular one of the multiple-bank memory elements is not explicitly shown in FIG. 6, but can be implemented in a straightforward manner, as will be appreciated by those skilled in the art. The second portion 606 of the thread identifier comprises the least significant bit of the three-bit identifier, and is applied as a select signal to selection circuitry 610 to select one of the banks B0 or B1 for use in conjunction with a particular memory access.

The diagram in FIG. 6 illustrates a read access, in which information is read from a selected one of the banks B0 and B1. However, this is by way of example only, and the invention can also be used for write accesses.

In the FIG. 6 embodiment, a given multiple-bank memory element M0, M1, M2 or M3 need have only a single memory port for read and write accesses. For example, the present invention makes it possible to read from each of the multiple-bank elements every cycle by alternating between the even and odd banks. As a result, a single memory port can function as if it in effect contained multiple ports. More specifically, two read or write memory accesses may be achieved per processor clock cycle with only a single memory port per multiple-bank memory element. This arrangement can be used to decrease memory access time, and reduce power consumption, while also avoiding processor thread stalls due to memory access issues.

Numerous alternative configurations of multiple-bank memory elements and memory banks are possible using the techniques of the invention. For example, one possible alternative configuration is to have two multiple-bank memory elements, each with four memory banks, in which case one bit of the thread identifier is used to select the multiple-bank memory element and two bits of the thread identifier are used to select one of the four memory banks within the selected multiple-bank memory element. More generally, if the number of multiple-bank memory elements is given by M, and B is the number of memory banks per multiple-bank memory element, the memory may be configured such that the product of M and B is equal to N, that is, $N=M*B$. Other arrangements are also possible. Furthermore, it should also be noted that each multiple-bank memory element need not have the same number of memory banks.

The thread identifier register 602 and the associated selection circuitry may be implemented as elements of the multithreaded processor 102. For example, in an embodiment of the invention in which the memory 600 corresponds to the cache memory 110, these elements may be implemented in whole or in part in the cache controller 114, or in another portion of the multithreaded processor 102.

The thread identifier register 602 stores a multi-bit thread identifier that is used by the multithreaded processor 102 to identify a particular thread. Such thread identifiers may be generated in a conventional manner, as will be apparent to those skilled in the art.

The term "thread identifier" as used herein is intended to include any information suitable for identifying a particular thread or a set of multiple threads in a multithreaded processor. By way of example and without limitation, the thread identifier may correspond to the output of a thread counter in a multithreaded processor. More particularly, a given multithreaded processor may be configured such that multiple threads are processed in a predetermined order, such as a round robin order, with the thread counter output being used to identify the particular thread being executed. In such an embodiment, there may be a total of eight threads that are processed in round robin order, with each thread being identified by a three-bit identifier, such that the output of a three-bit counter can be used to identify the particular thread being processed. Other embodiments may use a noncounter implementation of the thread identifier. A wide variety of different thread identifier configurations suitable for use with the present invention will be readily apparent to those skilled in the art.

The memory access technique as illustrated in FIG. 6 utilizes a single bit of the thread identifier to select an even or odd memory bank to be accessed by the corresponding processor thread. It is possible, however, to use n least significant bits of the thread identifier to select one of $2^n$ memory banks of a given multiple-bank memory element. Similarly, one may use m most significant bits of the thread identifier to select one of $2^m$ multiple-bank memory elements in a given memory associated with the multithreaded processor.

As indicated above, the thread-based memory access techniques of the present invention provide significant improvements relative to conventional techniques. For example, the techniques can improve memory access time. Also, the techniques can substantially reduce the number of required memory ports, thereby reducing power consumption. Moreover, these improvements are provided without impacting processor performance.

The above-described embodiments of the invention are intended to be illustrative only, and numerous alternative embodiments within the scope of the appended claims will be apparent to those skilled in the art. For example, as indicated previously, a given multiple-bank memory element can be divided into more than just an even bank and an odd bank as in FIG. 6, that is, it can be divided into n distinct portions, with an appropriate increase in the number of thread identifier bits used to select a given bank from within a given multiple-bank memory element. As another example, the particular selection circuitry arrangements used to implement the selection process can be replaced with alternative arrangements. Moreover, multithreaded processor configuration, the number of threads, number of multiple-bank memory elements, number of banks per memory element, thread identifier configuration and other parameters of the illustrative embodiments can be varied to accommodate the specific needs of a given application.

What is claimed is:

1. A method for accessing a memory associated with a multithreaded processor, the method comprising the steps of:

determining a thread identifier associated with a particular thread of the multithreaded processor; and utilizing at least a portion of the thread identifier to select a particular portion of the memory to be accessed by the corresponding processor thread;

wherein the utilizing step further comprises the steps of utilizing a first portion of the thread identifier to select one of a plurality of multiple-bank memory elements within the memory and utilizing a second portion of the thread identifier to select one of a plurality of memory banks within the selected one of the multiple-bank memory elements.

2. The method of claim 1 wherein the first portion comprises one or more most significant bits of the thread identifier.

3. The method of claim 1 wherein the second portion comprises one or more least significant bits of the thread identifier.

4. The method of claim 1 wherein each of the multiple-bank memory elements includes an even memory bank and an odd memory bank, and a least significant bit of the second portion is utilized to select one of the even memory bank and the odd memory bank for access by the corresponding processor thread.

5. The method of claim 1 wherein the memory comprises a main memory coupled to the multithreaded processor.

6. The method of claim 1 wherein the memory comprises a data memory of the multithreaded processor.

7. The method of claim 1 wherein the memory comprises a cache memory of the multithreaded processor.

8. The method of claim 7 wherein the cache memory comprises a plurality of thread caches, at least a given one of the thread caches comprising a memory array having one or more sets of memory locations.

9. The method of claim 8 wherein the given thread cache further comprises a thread identifier register for storing the thread identifier.

10. The method of claim 1 wherein the multithreaded processor is configured to utilize token triggered threading.

11. The method of claim 10 wherein the token triggered threading utilizes a token to identify in association with a current processor clock cycle a particular context that will be permitted to issue an instruction for a subsequent clock cycle.

12. The method of claim 1 wherein the multithreaded processor is configured for pipelined instruction processing.

13. A processor system comprising:

a multithreaded processor; and a memory associated with the multithreaded processor;

the multithreaded processor being operative to determine a thread identifier associated with a particular thread of the multithreaded processor, and to utilize at least a portion of the thread identifier to select a particular portion of the memory to be accessed by the corresponding processor thread;

wherein a first portion of the thread identifier is utilized to select one of a plurality of multiple-bank memory elements within the memory and a second portion of the thread identifier is utilized to select one of a plurality of memory banks within the selected one of the multiple-bank memory elements.

14. An article of manufacture comprising a machine-readable storage medium having embodied thereon program code for use in accessing a memory associated with a multithreaded processor, wherein the program code when executed by the processor implements the steps of:

determining a thread identifier associated with a particular thread of the multithreaded processor; and utilizing at least a portion of the thread identifier to select a particular portion of the memory to be accessed by the corresponding processor thread;

wherein the utilizing step further comprises the steps of utilizing a first portion of the thread identifier to select one of a plurality of multiple-bank memory elements within the memory and utilizing a second portion of the thread identifier to select one of a plurality of memory banks within the selected one of the multiple-bank memory elements.

* * * * *

UNITED STATES PATENT AND TRADEMARK OFFICE
CERTIFICATE OF CORRECTION

PATENT NO. : 6,925,643 B2
DATED : August 2, 2005
INVENTOR(S) : E. Hokenek et al.

It is certified that error appears in the above-identified patent and that said Letters Patent is hereby corrected as shown below:

<u>Column 1,</u>
Line 9, replace "Multibreaded" with -- Multithreaded --.

Signed and Sealed this

Thirty-first Day of January, 2006

JON W. DUDAS
*Director of the United States Patent and Trademark Office*